United States Patent
Pawlenko et al.

(12)

(10) Patent No.: US 6,349,606 B1
(45) Date of Patent: Feb. 26, 2002

(54) REDUCED BACKLASH TRANSLATING SYSTEM

(75) Inventors: Ivan Pawlenko, Holland; Timothy James Lawlor, Philadelphia, both of PA (US); Peter Michael Mueller, Suwanee, GA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/427,393

(22) Filed: Oct. 25, 1999

(51) Int. Cl.[7] .......................... F16H 25/20; F16H 57/12
(52) U.S. Cl. .................... 74/441; 74/89.29; 74/89.3; 74/89.31; 74/89.32; 74/89.42; 318/48; 318/630
(58) Field of Search .................. 74/89.15, 424.8 B, 74/441, 665 B, 89.29, 89.3, 89.31, 89.32, 89.42, 424.72; 318/48, 630

(56) References Cited

U.S. PATENT DOCUMENTS

| | | | |
|---|---|---|---|
| 3,310,998 A | * 3/1967 | Harmening | 74/661 |
| 3,434,025 A | * 3/1969 | Parkinson et al. | 318/8 |
| 4,325,015 A | * 4/1982 | Heiberger | 318/625 |
| 4,693,131 A | * 9/1987 | Teramachi | 74/89.32 |
| 4,916,963 A | * 4/1990 | Takei | 74/89.31 |
| 5,047,703 A | * 9/1991 | Akamatsu | 318/630 |
| 5,134,346 A | * 7/1992 | Schneider et al. | 318/8 |
| 5,267,478 A | * 12/1993 | Stridsberg | 74/89.17 |
| 5,646,495 A | * 7/1997 | Toyozawa et al. | 318/625 |
| 5,704,250 A | * 1/1998 | Black | 74/424.8 B |
| 5,799,543 A | * 9/1998 | Nagai et al. | 74/490.09 |

* cited by examiner

Primary Examiner—Allan D. Herrmann
(74) Attorney, Agent, or Firm—Michael Y. Epstein; Henry I. Schanzer

(57) ABSTRACT

Apparatus embodying the invention includes first and second motors coupled to a carriage assembly for moving the carriage assembly back and forth between first and second end points. The first motor is for developing a force to drive the carriage in one direction and the second motor is for developing a force to drive the carriage in an opposite, second direction. When the first motor causes the movement of the carriage in one direction, the slowing, stopping and reversal of the carriage is achieved by varying the power supplied to the second motor relative to the power supplied to the first motor until the force exerted by the second motor first equals and then exceeds the force exerted by the second motor. So operated, the carriage motion is well controlled and exhibits little, if any, backlash.

5 Claims, 3 Drawing Sheets

REDUCED BACKLASH TRANSLATING SYSTEM

BACKGROUND OF THE INVENTION

This invention relates to systems for controlling movements of a workpiece along a path, and particularly to such systems where backlash is substantially reduced for avoiding uncontrolled movements of the workpiece.

This application incorporates by reference the teachings of application Ser. No. 09/427,392 entitled "Apparatus and Method For Fabricating Optic Fiber Preforms", filed Oct. 25, 1999, simultaneously with the filing of this application.

In numerous manufacturing processes, a carriage is moved back and forth along a path, an example being a lathe where a tool is moved back and forth along a path parallel to the axis of a rotating spindle. In some processes, it is essential that the rate of movement of the carriage be extremely precise and controlled. While it is generally possible to achieve highly controlled movements of the carriage in any direction, a problem generally exists at the ends of the carriage path where the carriage must stop and change direction. The problem arises from the fact that even in the most precisely machined apparatus, some degree of looseness of fit among parts of the system exists either directly from the manufacturing tolerances or from inevitable wear. Thus, when the carriage, moving in one direction, first stops and begins to move in the opposite direction, some inevitable lag, and accompanying uncontrolled movement of the carriage, occurs until parts in the drive train, pushing against one another in one direction, move through tiny gaps for re-engaging and pushing one another in the opposite direction.

Various means, such as constant friction members and spring loaded members are known for maintaining parts of a driving train in constantly stressed relationship for avoiding backlash. The present invention provides a novel arrangement which is quite simple and relatively inexpensive to implement.

SUMMARY OF THE INVENTION

First and second independent force generators (e.g., known a.c. or d.c. motors) provide controlled and variable amounts of force to a carriage to cause movement of the carriage in a first direction or in a second, opposite, direction (e.g., forward and reverse directions). At certain periods of time, the forces from first and second independent force generators are simultaneously applied to the carriage so as to oppose each other with the direction of movement of the carriage being determined by the larger of the two forces. The forces of the first and second force generators are always applied at the ends of travel of the carriage just prior to the carriage coming to a stop and reversing its direction of movement, e.g., from forward to reverse. Thus, at each end of travel, when one of the first and second force generators is exerting a force causing movement of the carriage in one direction, the variable force of the other one of the first and second force generators which, when large enough, causes reverse direction movement of the carriage, is already being applied against the carriage. Backlash is thus significantly reduced, if not avoided.

In one embodiment, both forces are applied continuously against the carriage, with the rate of movement being determined by the larger of the forces, and with the smaller force providing braking for greater precision of the driving of the carriage by the larger force.

DESCRIPTION OF THE DRAWING S

DESCRIPTION OF PREFERRED EMBODIMENTS

Figure 1:
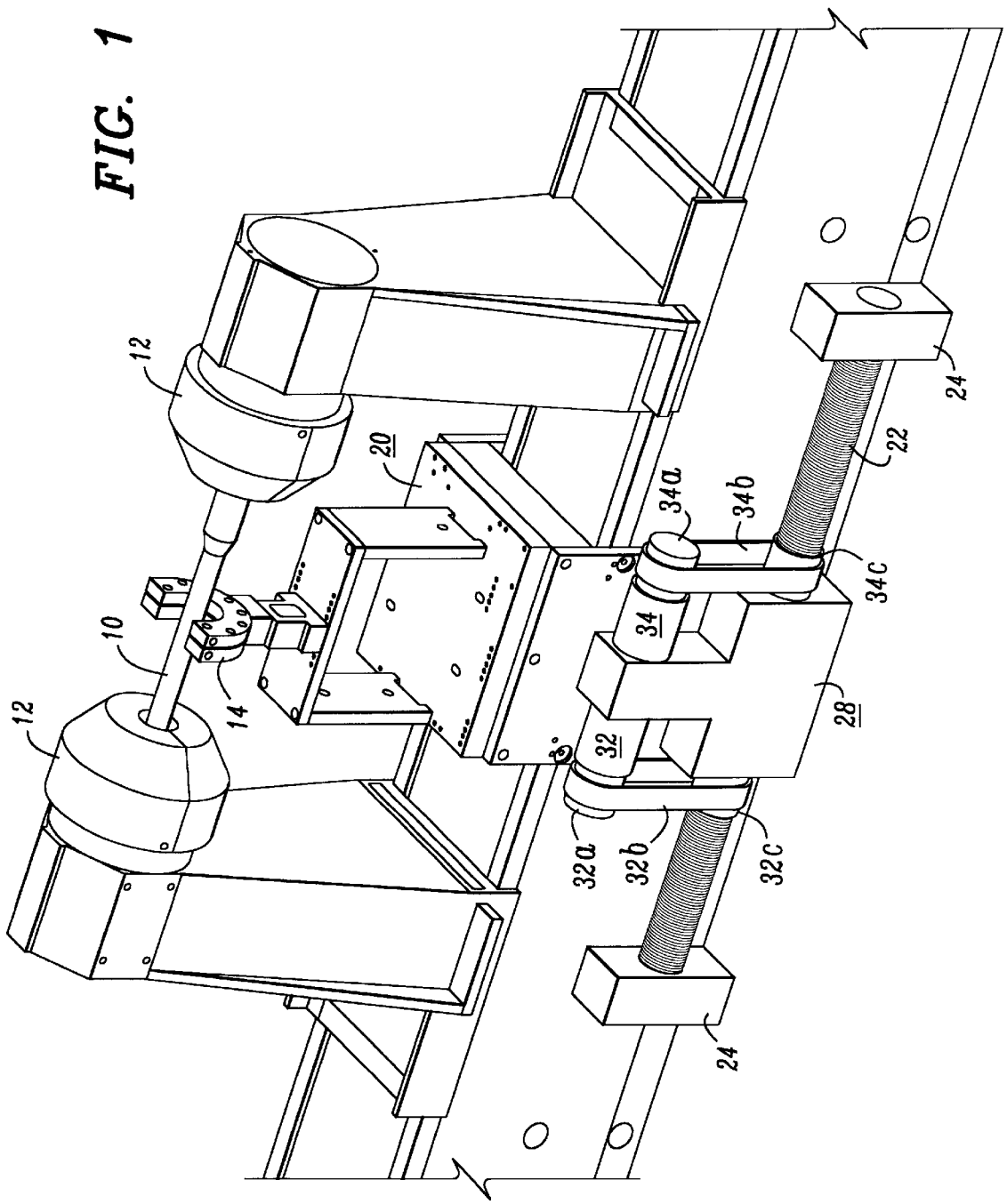
FIG. 1 is a view, in perspective, of a generally known lathe-type apparatus modified according to the present invention.

FIG. 1 shows a lathe-type apparatus making use of the present invention. An elongated glass tubing 10 is supported between two chucks 12. Reactant gasses are passed through the tubing between the chucks for the deposition of soot particles on the tubing walls. A controlled conversion of the soot p articles into layers of glass is obtained in response to controlled heating of the tube by flames from a gas burner 14 travelling back and forth along the tube length. In certain processes, e.g., the formation of an optic fiber glass boule made in apparatus of the type herein shown, precision movement of the gas burner 14 back and forth along the tubing is essential. Although the burner 14 must change speed upon each reversal of direction, provided no backlash is present, the rates of speed change can be known and compensated for by other changes in the processing, e.g., by the rates of gas flow through the tubing. The present invention provides means for driving the burner 14 back and forth along the tubing 10 essentially without any backlash. Also, in a preferred embodiment, not only is backlash avoided, but improvement in the control of the rate of movement of the carriage along the entire length of its travel is obtained.

As shown in FIG. 1, the gas burner 14 is mounted on a carriage 20 mounted for being driven along a drive screw 22 by rotation of a nut (not visible in FIG. 1) along the drive screw 22. Either the screw or the nut can be rotated and, in either case, the carriage is inelastically connected to the nut for axial movement therewith. Mechanisms, such as used in lathes, drill presses and the like, can be used for mechanically interconnecting the screw driven nut to the carriage 20. In known apparatus, the drive screw is typically controllably rotated for linearly advancing a nut and attached carriage along the axis of the screw. Alternatively, a motor is coupled to the nut for rotating it for screwing it along the drive screw. In such case, a bearing is typically used for securing the carriage to the nut for free rotation of the nut relative to the carriage while linearly moving the carriage in exact correspondence with movement of the nut along the screw.

The present invention is relevant to how the nut (or nuts) used for moving the carriage is itself moved. In the embodiment illustrated in FIG. 1, a stationary drive screw 22 is used rigidly secured between two stationary blocks 24. A housing 28 is mounted for axial movement along the screw 22 by drive means, to be described, in threaded engagement with the screw. The housing 28 is rigidly secured to the carriage 20 on which the gas burner 14 is rigidly mounted. FIG. 1 shows one side of the carriage. The other side (not visible in FIG. 1) is slidably mounted on a shaft precisely parallel to the drive screw 22. Mounted on the housing 28 for movement therewith are two motors 32 and 34 used for driving the carriage 20. Each motor is independently operable by a known control means, not shown, and each motor provides two functions. One function is to continuously move the housing 28 and the carriage 20 in a respective direction axially along the drive screw 22. The other function of each motor is to serve as a brake for slightly resisting the movement of the housing 28 caused by the other motor.

Each motor 32 and 34 has, respectively, a drive shaft (not visible in FIG. 1) for turning a pulley 32a and 34a and a belt 32b and 34b. The two belts 32b and 34b drive respective pulleys 32c and 34c for transmitting torque developed by the respective motors 32 and 34 to carriage driving means disposed within the housing 28.

Figure 2:
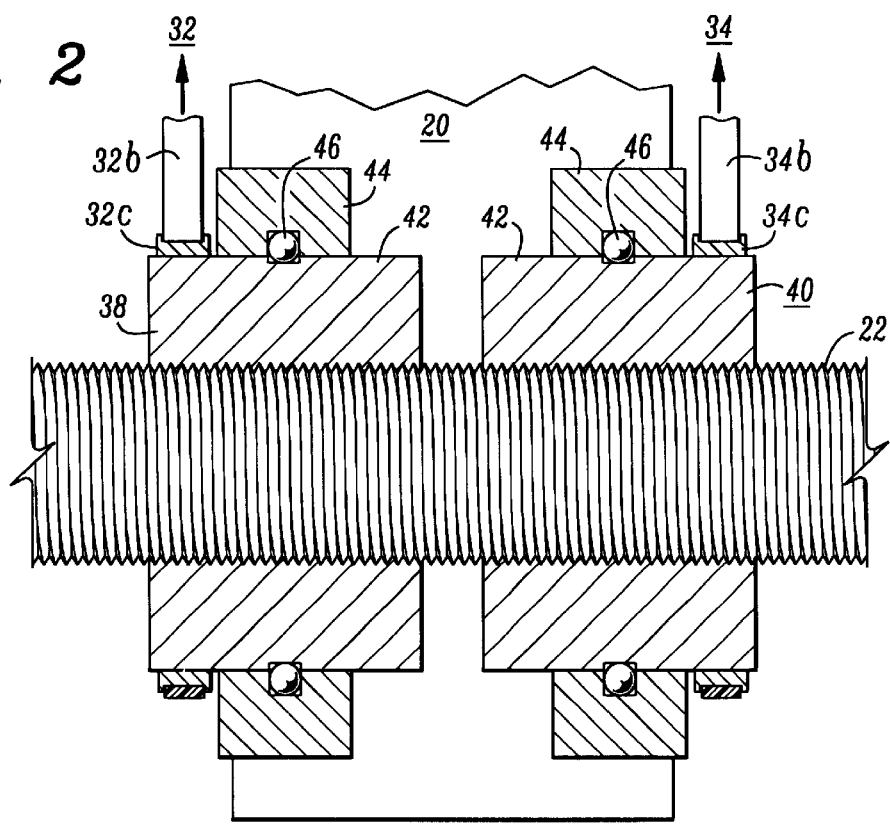
FIG. 2 is a side sectional view of a torque transmitting mechanism in accordance with one embodiment of the invention; the mechanism being disposed within a housing shown in FIG. 1.

FIG. 2 shows one embodiment of a carriage driving means which can be disposed within the housing 28 shown in FIG. 1. The driving means comprises two ball nuts 38 and 40 of known type each comprising, in accordance with known technology, an inner, internally threaded cylinder 42 and an outer cylinder 44 freely rotatable relative to the inner cylinder 42 by ball bearings 46, but rigidly connected to the inner cylinder for axial movement therewith.

The ball nuts 38 and 40 are identical, each is meshed with the drive screw 22 and each is driven by a respective motor 32 or 34. Thus, as illustrated in FIG. 2, the pulley 32c driven by the belt 32b from (FIG. 1) the motor 32 is rigidly secured to the inner cylinder 42 of the ball nut 38 for applying torque against the inner cylinder 42 in response to torque generated by the motor 32. Similarly, torque generated by the motor 34 is applied to the inner cylinder 42 of the ball nut 40 by means of the belt pulley 34c rigidly secured to the inner cylinder 42 of the ball nut 40.

The use of single ball nuts of the type shown in FIG. 2 for driving lathe-type apparatus is known and, using but one ball nut 38 or 40, the apparatus shown in FIG. 2 could be used for driving a known prior art lathe-type carriage. Considering only the ball nut 38, for example, and assuming the absence of the ball nut 40, the outer cylinder 44 of the ball nut 38 is rigidly coupled to the carriage 20 (see, also, FIG. 1) and, upon operation of the motor 32 for causing rotation of the inner cylinder 42 of the ball nut 38, the ball nut 38 is axially screwed along the drive screw 22 for axially advancing the carriage 20. The motor 32 is reversible, and travel of the carriage 20 in both directions is obtained under control of the single motor 32.

In the embodiment of the invention illustrated in FIG. 2, both nuts 38 and 40 are present, both are respectively rigidly connected to the two pulleys 32c and 34c which, in this embodiment, are rigidly engaged (FIG. 1) to the drive shafts of the respective motors 32 and 34. As previously noted, both motors are, at times, simultaneously powered for developing torques tending to rotate the two ball nuts 38 and 40 in opposite directions. No belt slippage occurs, and all the rotatable parts, i.e., the respective pairs of pulleys 32a,32c and 34a,34c, and the two belts 32b and 34b, are all rotatable in directions corresponding to axial movements of the two ball nuts 38 and 40 in the same direction. What occurs is if, for example, the motor 32 is energized to generate a higher torque than that generated by the motor 34, all directions of movement in the drive train are determined solely by the direction of turning of the motor 32. Thus, if the motor 34 (of lower torque) would, if energized in the absence of the motor 32, turn in a direction to rotate its drive shaft clockwise and to attempt to rotate the ball nut 40, e.g., clockwise for advancing the carriage to the left, owing to the higher torque of the motor 32, the torque applied by the motor 34 is overcome and the greater or net torque applied to the ball nut 38 causes actual rotation of the nut 38 (in this example) counter clockwise and actual advance of the carriage 20 to the right. Because the ball nut 40 is rigidly threaded on the drive shaft 22, actual movement of the carriage 20 to the right causes actual counter clockwise rotation of the ball nut 40. Thus, while the torque generated internally of the motor 34 coupled to the ball nut 40 is in a direction to cause clockwise rotation of the drive shaft of the motor 34, the counterclockwise rotation of the ball nut 40 (as caused by the rightward movement of the carriage 20 along the drive shaft 22) causes counterclockwise rotation of the drive shaft of the motor 34. The motor 34 is thus driven backwards in a direction opposite to the direction of torque being generated by the motor 34. The "counter direction" torque produced by the motor 34 acts as a drag against the "forward direction" torque of the motor 32 driving the ball nut 38 to the right.

A principle use of the "counter torque" (i.e., that torque being produced by the motor not actually driving the carriage 20) is to eliminate backlash in the drive train at the time of reversal of direction of the carriage. In the absence of a two motor drive system, as herein disclosed, a typical practice is, as previously noted, to rotate a carriage mounting ball nut by a single, reversible motor. As known, in the absence of special means for preventing backlash, some degree of looseness in the drive train of such single motor systems is inevitably present leading to backlash at the time the carriage first comes to a stop and begins travel in the reverse direction. For example, during movement of a single motor driven carriage to the right along a drive screw, all engaging parts of the drive train are firmly pressed against one another and are at least slightly strained (distorted) in directions corresponding to the direction of force transmittal along the drive train. When the carriage comes to a stop and the single motor drive shaft begins to turn in the reverse direction, actual movement of the carriage does not begin until all the strains in the right-hand, force transmitting direction are reversed, and any gaps between surfaces providing force transmittal in the left-hand direction are closed. This takes time and, more significantly, is a function of the tolerances actually present when the drive train is first assembled and how these tolerances change with time and wear of parts. Such factors are not known and, even if measured at any time, change with time. Thus, during the period when backlash is delaying positive transmittal of movement causing forces, the movement of the carriage is not under direct control and is randomly variable. Such unknown and uncontrolled movements of the single motor driven carriage, at the instants of reversal of direction of the carriage, can lead to undesirable variations in the processing of a workpiece or a workpiece processing tool mounted on the carriage.

In accordance with the present invention, however, by energizing one of the two motors not actually advancing the carriage just shortly before the carriage reaches the end of its travel in a "forward" direction, a "reverse" direction force is created which causes the force transmitting parts of the drive train associated with the reverse direction driving motor to be in rigid force transmitting relationships. Thus, at the instant when the carriage stops travel in the first direction and is to start travel in the reverse direction, no time delay occurs for the transmittal of the reverse direction force which is already being transmitted prior to the stoppage of the carriage.

Another problem associated with changing direction of travel of a carriage is that the carriage must come to a complete halt, even if only for a vanishingly small instant. Standing friction is considerably higher than moving friction, and restarting of the carriage cannot occur until the reverse driving force is large enough to overcome such standing friction. Thus, with a single motor, at the instant the motor shaft begins to turn in an opposite direction, for reversing the direction of movement of the carriage, even after backlash has been overcome and reverse direction force is being transmitted through the drive train, no carriage movement begins until the level of force being transmitted increases to an amount sufficient to overcome standing friction.

In accordance with the present invention, however, by applying a reverse direction force to the carriage in a "threshold" amount greater than the force to overcome standing friction, upon removal of the forward direction driving force, a reverse direction driving force sufficiently large to overcome standing friction is already present for immediate application against the carriage.

Stating the foregoing slightly differently, the axial directions of movements of the ball nuts 38 and 40 are determined by the sum or net of the two oppositely directed forces being applied. At the end of travel of the carriage in the "forward" direction, the torque from the forward direction driving motor is reduced while the torque from the drag producing motor is increased. Because no backlash is present (as previously described), the rates of torque change are a function solely of the speed control parameters of the motors. When the opposing torques are equal, the net torque on the two ball nuts 38 and 40 is zero and the carriage has come to a complete halt. Although the net torque on the two ball nuts is zero, the actual level of torque being applied by the reverse driving motor is, as described, above the level necessary to overcome standing friction and, dependent solely upon the rate of decrease of torque from the forward driving motor, a large reverse direction driving torque is essentially immediately available for reverse driving the carriage.

As above-described, stoppage and re-starting of travel of the carriage is a function of the rates of change of torque from two motors. Using a single motor, stopping and re-starting the carriage involves bringing the motor torque completely to zero and then raising the torque level, in the opposite direction, sufficiently high to overcome standing friction. With two motors, stoppage and re-starting can occur while the torque from the forward direction driving motor is still relatively high, as determined by the magnitude of torque from the reverse driving motor, and essentially independent of the subsequent further reduction in torque of the forward direction motor.

For example, if the torques for driving the carriage in either direction are 10 ft-lbs, cross-over of torques (for zero net torque) can occur at a high level, e.g., at 9 ft-lbs from each motor, or at a low level, e.g., at 3 ft-lbs (but always, as described, at a level above that necessary for overcoming standing friction). Provided the motor providing the drag function is turned on only shortly before the carriage reaches its turn-around point, it is generally preferable that a high cross-over torque level is used. Then, only a minimum time delay is present before the reverse direction torque reaches the illustrative steady-state level of 10 ft-lbs.

Turning on the reverse direction torque applying motor only shortly before the carriage reaches the end of its forward direction travel is most economical in the use of electrical power.

However, in a preferred embodiment, both motors are on constantly, throughout the forward and backward travel of the carriage, but with one motor drive train providing a higher torque than the other motor drive train for driving the carriage in a "forward" (or "backward") direction, and the other motor drive train applying a relatively small torque opposing the forward (or backward) direction driving torque. The presence of the small (and constantly applied) opposing torque tends to provide a more uniform rate of travel of the carriage. The speed of travel of the carriage is a function of the net of the driving torques and the system friction. In the prior art, using but one, reversible driving motor, the speed of travel is a function only of the motor driving torque and the system friction. While the motor driving torque is quite accurately controllable, the friction of the system tends to be variable, particularly with time and with variable wear. Thus, during driving of the carriage with but a single motor, the sudden encountering of a change in friction in the system can result in a lurching of the carriage. Such lurching is significantly decreased using two opposed driving torques because the opposing torque serves as a brake against sudden lurchings in response to decreases of friction in the system.

Figure 2A:
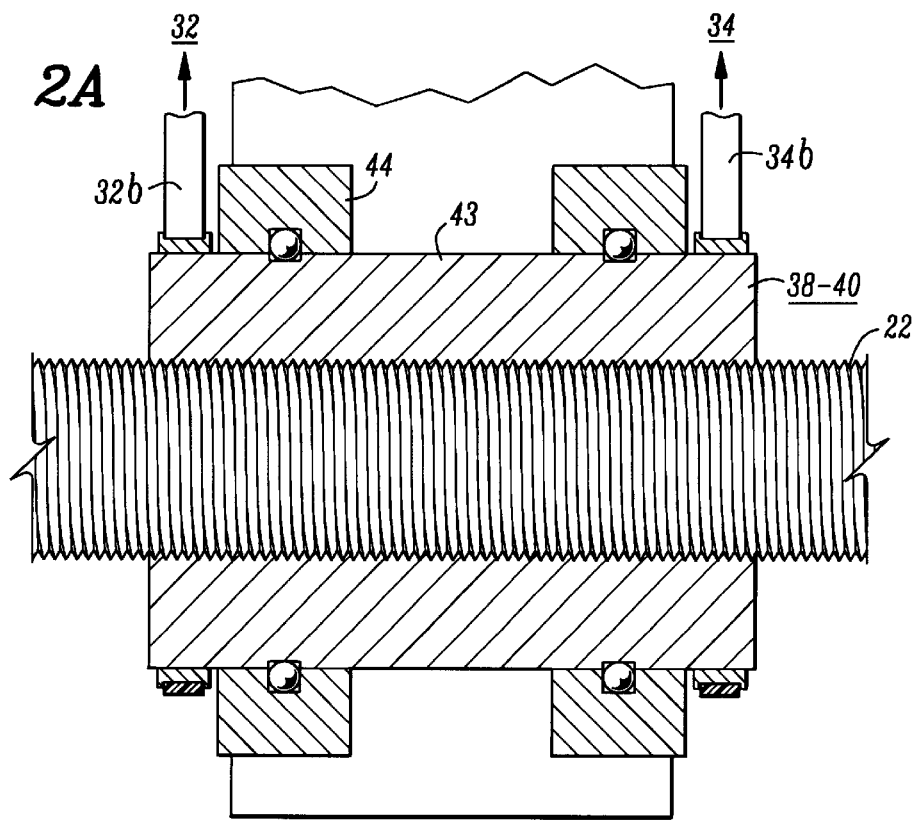
FIG. 2A is a view similar to FIG. 2 but showing a modification thereof.

In another embodiment, shown in FIG. 2A, the two separate ball nuts 38 and 40 shown in FIG. 2 are combined as a single ball nut 38–40 identical to either ball nut 38 or 40 but with both motor drive n belt pulleys attached at opposite ends of a common inner cylinder 43. Operation is the same as previously described. With both motors 32 and 34 energized, the motor providing the higher torque determines the direction of movement of the carriage while the other motor provides a braking force.

As described, each motor 32 and 34 provides two functions; one being to drive the carriage along the drive (lead) screw and the other being to oppose the motion of the carriage. It is possible, however, to separate the two functions. For example, in the embodiment shown in FIG. 1, the drive screw 22 is stationary and power for advancing the carriage is provided through the two motors. Alternatively, the drive screw 22 can be rotated by a motor, not shown, but which can be disposed, for example, within one of the stationary blocks 24, whereby it is the rotation of the drive screw which provides power for advancing the carriage or the two nuts 38 and 40. In such rotating screw arrangement, while the two motors are not used for causing movement of the carriage along the drive screw, the two motors are used, as previously described, for opposing axial movements of the carriage and for reducing backlash between the drive screw and the carriage.

A situation where it might be preferable to rotate the drive (lead) screw is with an exceptionally massive carriage requiring quite large motor power for carriage movement.

Thus, two quite large motors 32 and 34 would be required in the embodiment shown in FIG. 1. If the motors 32 and 34 served solely the backlash reducing function, smaller motors (movable with the carriage) could be used. However, means would still have to be provided for reducing backlash between the drive screw rotating motor and the drive screw. With the stationary drive screw arrangement shown in FIG. 1, all backlash in the power drive trains between the carriage moving power sources (e.g., the motors 32 and 34) and the carriage is essentially removed.

Although the invention has been described in connection with linear motion of a carriage, controlled rotary motion can also be utilized. For example, if the two ball nuts 38 and 40 shown in FIG. 2 are replaced with two separate and spaced apart hubs of a single rotatable wheel fixedly secured to a common shaft rotatable under control of the two motors 32 and 34, the two motors would function to provide controlled, reversible direction of the wheel without backlash and with minimal uncontrolled lurchings in response to instantaneous variable loading of the wheel. (A more simple arrangement is a single hub driven by two motor driven belt pulleys secured at axially opposite ends of the single hub.)

In general, known types of force generators can be used in the implementation of the invention. A.C. induction motors, d.c motors or even stepper motors under control of known power controlling systems can be used; similarly, hydraulic, pneumatic motors and the like can be used.

Figure 3:
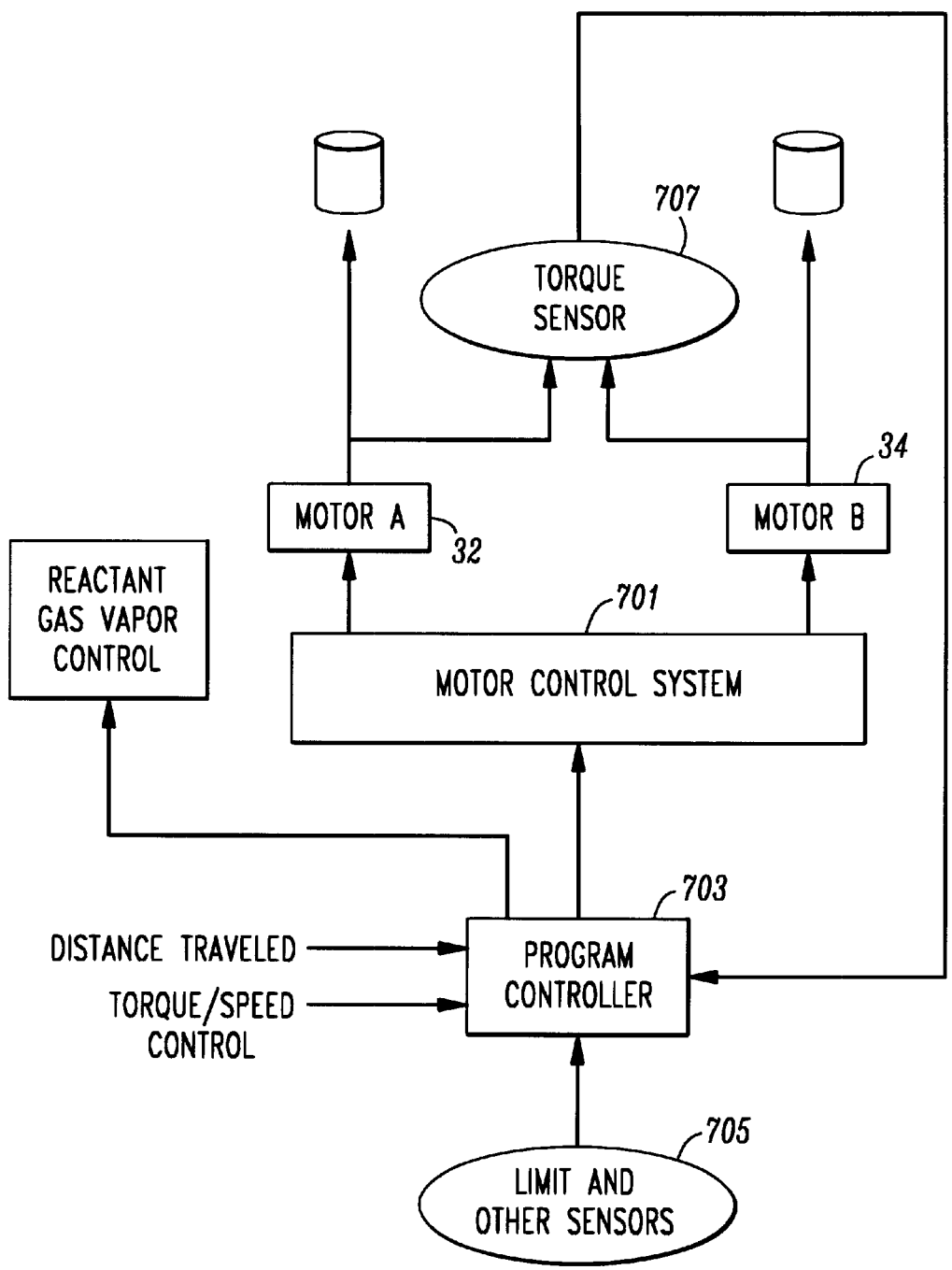
FIG. 3 is a block diagram of a motion control circuitry in accordance with the invention.

By way of example of a suitable control system, FIG. 3 is a block diagram showing electrical controls for the motors 32 and 34. The motor control circuit 701 supplies electrical power to the motors. In the illustrative process shown, for making an optical fiber preform, the motor control circuit is controlled by a micro-controller or programmer 703 preprogrammed with information as to the distance the carriage 20 (FIG. 1) must travel along the tube, permissible rates of increase of the speed and/or torque of the motors and the desired speed at which the carriage is to go in the steady state condition along most of the length of the tube 10. Alternatively, the system may include optical and/or electronic sensors 705 to sense when the carriage nears or reaches the ends of the travel path. These sensors 705 then provide signals to the programmer 703 to initiate the application of power to the motors such that the carriage decelerates, then stops, and then accelerates in the opposite direction.

The system embodying the invention may also include a torque sensor circuit 707 to sense the differential torque produced by the motors 32 and 34. To prevent backlash and/or dither and/or jerky motion, it is desirable that the torques of the motors do not change too quickly relative to one another. To achieve this result, a differential torque sensor 707 is used and its output is fed back to the programmer 703 to supply correct control signals to the motor control circuit 701 which supplies the electrical power to the motors.

In systems for making fiber optic preforms embodying the invention, there is much greater control over the formation of the glass layers within the tube 10. For example, during the time when the carriage changes direction and travels at a lower average speed, a greater degree of heat is applied to the tube. However, owing to the high degree of control in the movements of the carriage provided by the invention, the profile of the reactants and gas vapors can be modified to compensate for the rate change of movement of the carriage. Furthermore, since the movement of the carriage assembly is tightly controlled by the motors, a high degree of compensation is possible. Thus, in FIG. 3, the programmer 703 produces an output signal on line 708 which is supplied to a reactant and gas vapor control 709 which controls the amount of reactants and gas vapors applied to the tube based upon the known rates of movement of the carriage at the ends of the path of carriage travel. Thus, uniform processing is obtained in spite of the inevitable, but known, carriage speed changes.

While the invention has been described in detail herein in accord with certain embodiments thereof, many modifications and changes therein may be effected by those skilled in the art. Accordingly, it is intended by the appended claims to cover all such modifications and changes as fall within the true spirit and scope of the invention.

What is claimed is:

1. Apparatus comprising:
    a carriage movable along a path between first and second points;
    first and second motors coupled to the carriage for moving it in first and second opposite directions, respectively, between the first and second points;
    motor control circuitry coupled to the first and second motors for powering the motors such that each motor opposes the motion of the other, with a direction of motion of the carriage being determined by the motor generating the higher carriage moving force;
        said motors each generating a torque for moving the carriage in said respectively first or second directions when the motors are powered, each motor having a drive shaft which rotates in a direction determined by the motor generating the higher torque;
        said motors being rigidly coupled to a single threaded nut mounted for screwing movement axially along a drive screw, the direction of advance of the nut along the screw being a function of the relative torques generated by said motors, and said carriage being connected to said nut and driven thereby axially along said drive screw in exact correspondence with the axial movement of said nut along said screw.

2. Apparatus comprising:
    a carriage movable along a path between first and second points;
    first and second motors coupled to the carriage for moving it in first and second opposite directions, respectively, between the first and second points;
    motor control circuitry coupled to the first and second motors for powering the motors such that each motor always opposes the motion of the other when both motors are simultaneously powered, with a direction of motion of the carriage being determined by the motor generating the higher carriage moving force;
        the motors each generating a torque for moving the carriage in said respectively first or second directions when the motors are powered, each motor having a drive shaft which rotates in a direction determined by the motor generating the higher torque;
        the motors being rigidly coupled to a single threaded nut mounted for screwing movement axially along a drive screw, the direction of advance of the nut along the screw being a function of the relative torques generated by said motors; and said carriage being connected to said nut and driven thereby axially along said drive screw in exact correspondence with the axial movement of said nut along said screw.

3. Apparatus comprising:

a carriage assembly to be moved along a track between first and second points;

first and second motor assemblies coupled to the carriage assembly for moving it in either a first direction or a second direction, opposite to said first direction, between the first and second points;

motor control circuitry coupled to the first and second motor assemblies for powering the first and second motor assemblies such that each motor assembly always opposes the motion of the other when both motors are simultaneously powered, with motion of the carriage assembly in one direction being obtained by increasing the application of power to the first motor assembly relative to the second motor assembly and motion of the carriage assembly in the opposite direction being obtained by increasing the application of power to the second motor assembly relative to the first motor assembly;

said carriage being mounted on a lead screw; and said carriage assembly being coupled to the lead screw via a single nut.

4. Apparatus comprising a carriage moveable in first and second opposite directions along a path between first and second points, a rotatable drive screw connected to said carriage and being the sole means for causing movements of the carriage in said first and second directions, and a first motor mounted for movement with the carriage for applying a force solely for opposing the movement of the carriage in said first direction.

5. An apparatus according to claim 4 including a second motor for applying a force solely for opposing the movement of the carriage in said second direction.

* * * * *